United States Patent
Schaaf

(10) Patent No.: US 9,618,318 B2
(45) Date of Patent: Apr. 11, 2017

(54) METHOD FOR CONTACTLESSLY MEASURING A RELATIVE POSITION BY MEANS OF A 3D HALL SENSOR HAVING MEASUREMENT SIGNAL STORE

(71) Applicant: Tyco Electronics AMP GmbH, Bensheim (DE)

(72) Inventor: Oliver Schaaf, Lustadt (DE)

(73) Assignee: TD Connectivity Germany GmbH, Bensheim (DE)

( * ) Notice: Subject to any disclaimer, the term of this patent is extended or adjusted under 35 U.S.C. 154(b) by 397 days.

(21) Appl. No.: 14/381,911

(22) PCT Filed: Mar. 1, 2013

(86) PCT No.: PCT/EP2013/054134
§ 371 (c)(1),
(2) Date: Aug. 28, 2014

(87) PCT Pub. No.: WO2013/127984
PCT Pub. Date: Sep. 6, 2013

(65) Prior Publication Data
US 2015/0046117 A1   Feb. 12, 2015

(30) Foreign Application Priority Data

Mar. 1, 2012   (DE) .................. 10 2012 203 225

(51) Int. Cl.
*G01D 5/14* (2006.01)
*G01B 7/30* (2006.01)
(Continued)

(52) U.S. Cl.
CPC .............. *G01B 7/30* (2013.01); *G01B 7/004* (2013.01); *G01D 5/145* (2013.01); *G01D 5/24495* (2013.01); *G01D 5/142* (2013.01)

(58) Field of Classification Search
CPC combination set(s) only.
See application file for complete search history.

(56) References Cited

U.S. PATENT DOCUMENTS 4,606,008 A   8/1986   Wason
6,502,544 B2   1/2003   Kubota et al.
(Continued)

FOREIGN PATENT DOCUMENTS

DE   102009028170 A1   2/2011
DE   102010003292 A1   9/2011
(Continued)

OTHER PUBLICATIONS

International Preliminary Report on Patentability issued by the International Bureau of WIPO, Geneva, Switzerland, dated Sep. 2, 2014, for International Application No. PCT/EP2013/054134; 6 pages.

(Continued)

*Primary Examiner* — Huan Tran
(74) *Attorney, Agent, or Firm* — Faegre Baker Daniels LLP

(57) ABSTRACT

The present invention relates to a method for contactlessly measuring a relative position of a magnetic field source (102) which produces a magnetic field and a magnetic field sensor (100) in relation to each other. The present invention further also relates to a corresponding displacement sensor. The invention describes an operating principle of a sensor which is based on the Hall effect and which achieves an increase in the sensor output range with a magnet which is simultaneously reduced in size by storing the earlier value when control by the magnetic field is lost. In particular, the method comprises the steps of: calculating the position signal on the basis of a quotient of two magnetic flux density components; calculating a magnitude of the magnetic flux density and comparing the magnitude with a predetermined (Continued)

threshold value; outputting the current calculated position signal if the magnitude of the magnetic flux density is higher than the threshold value; outputting a preceding stored position signal if the magnitude of the magnetic flux density is smaller than or equal to the threshold value; storing the output position signal.

11 Claims, 11 Drawing Sheets

(51) Int. Cl.
*G01D 5/244* (2006.01)
*G01B 7/004* (2006.01)

(56) References Cited

U.S. PATENT DOCUMENTS

| 2002/0167306 | A1 | 11/2002 | Zalunardo et al. |
| 2012/0016625 | A1 | 1/2012 | Hernandez-Oliver et al. |
| 2012/0181958 | A1 | 7/2012 | Chabaud |
| 2013/0027028 | A1 | 1/2013 | Hohe et al. |

FOREIGN PATENT DOCUMENTS

| DE | 102012205903 | * | 10/2013 | ............... G01B 7/00 |
| EP | 0979988 | * | 2/2000 | ............. G01D 5/145 |
| EP | 1243897 | A1 | 9/2002 | |
| EP | 2159546 | * | 3/2010 | ............... G01D 5/14 |
| EP | 2159546 | A2 | 3/2010 | |
| EP | 2166312 | A1 | 3/2010 | |

OTHER PUBLICATIONS

International Search Report and Written Opinion issued by the European Patent Office, Rijswijk, Netherlands, dated Aug. 1, 2013, for International Application No. PCT/EP2013/054134; 9 pages.

Examination Report dated Nov. 16, 2012, issued by the German Patent and Trademark Office, Munich, Germany, for German Patent Application No. 102012203225.8; 10 pages.

* cited by examiner

METHOD FOR CONTACTLESSLY MEASURING A RELATIVE POSITION BY MEANS OF A 3D HALL SENSOR HAVING MEASUREMENT SIGNAL STORE

BACKGROUND

The present invention relates to a method for contactlessly measuring a relative position of a magnetic field source which produces a magnetic field and a magnetic field sensor in relation to each other. The present invention further also relates to a corresponding displacement sensor. The invention describes an operating principle of a sensor which is based on the Hall effect and which achieves an increase in the sensor output range with a magnet which is simultaneously reduced in size by storing the earlier value when control by the magnetic field is lost.

By means of the method according to the invention, in particular linear movements are intended to be detected and evaluated contactlessly by means of magnetic interaction between one or more permanent magnets and a magnetic sensor based on the Hall effect.

The measurement of linear movements is used, for example, for controlling machine tools, in pneumatics, in automation technology and robotics and in the automotive sector. A contactless detection of movements affords the advantage inter alia of freedom from wear. The optical and magnetic methods are the most widespread among the contactless measurement methods. Whilst the optical methods ensure a very high level of precision owing to the small wavelength of light, magnetic methods are far less sensitive to dirt and damage, in particular in that magnets and sensor components can be completely enclosed in a non-magnetic hermetic casing.

There are marketed by various producers displacement sensor systems in which the position of a displaceable permanent magnet is established by means of a two or three-dimensional Hall sensor.

In order to detect the relative linear movements at a location, two mutually perpendicular magnetic field components are measured and their quotient is evaluated to detect the position. This method has the advantage that, in regions in which a field component assumes an extreme value and therefore does not detect small displacements, the other field component reacts all the more strongly to displacements so that a substantially equally high level of measurement precision is provided in the complete measurement range.

Furthermore, this principle has the advantage that it is comparatively not very sensitive to a change in the absolute magnetic field strength because proportional numbers between the field components are used to detect the position.

European Patent specification EP 0979988 B1 discloses measurement methods for contactless magnetic detection of relative linear movements between permanent magnets and electronic sensors. In order to detect the relative linear movements by means of the electronic sensors, there are detected at a position two mutually perpendicular field components whose quotient is evaluated in order to detect the position.

In a second method variant, the known measurement method can also be carried out in such a manner that, in order to detect the relative linear movements by means of the electronic sensors, there are detected at two locations two mutually perpendicular field components whose quotient is evaluated in order to detect the position.

The published European Patent Application EP2159546 A2 discloses a measurement method for the contactless detection of relative linear movements between a sensor arrangement for detecting two mutually perpendicular magnetic field components (R, A) and a permanent magnet. A two or three-dimensional Hall sensor is used in place of individual sensors for detecting various field components. The quasi linear position measurement line is formed by the function U=y−e+g, where y is the functional relationship of the field components and e and g are predeterminable voltage values. In particular, a quasi linear position measurement line U=f(y) is formed from the output signals of the Hall sensor according to the relationship y=a+b·R/f (c·R″+d·A″), where R is the radial field component, A is the axial field component, U is the measurement voltage and a, b, c, d and n are constant factors.

The published European Patent Application EP1243897 A1 relates to a magnetic displacement sensor which comprises a magnetic field source and a magnetic field sensor which can be displaced relative to each other along a predetermined path. The magnetic field sensor measures two components of the magnetic field produced by the magnetic field source. There is then derived from the measured components a position signal which constitutes the relative position of the magnetic field sensor and magnetic field source. The explanations set out in this publication in respect of the displacement sensor are distinguished in that the establishment of the position signal contains a division of the two measured components of the magnetic field.

However, those known methods have the disadvantage that the magnetic control field becomes very weak at the ends of the measurement range so that the components of the magnetic flux density used to calculate the position assume small values and therefore the signal-to-noise ratio of both values becomes unfavourable for the calculation.

FIG. 1 shows an arrangement in which a Hall sensor 100 is arranged in a fixed position in order to contactlessly detect a linear movement and the magnetic field of a movable permanent magnet 102 is detected. In accordance with the north/south polarisation in the direction of movement of the permanent magnet 102, the magnetic field extending in the direction of movement is subsequently designated to be the magnetic field component Bz and the component extending transversely thereto is subsequently designated By.

FIG. 2 shows the path of the components By and Bz of the magnetic flux density in accordance with the location z at which the permanent magnet 102 is located. The zero position is the position at which the permanent magnet 102 and the sensor 100 are directly opposite each other.

The angle α which can be calculated in accordance with the following equation (1) is generally used as the measurement signal.

$$\alpha = \arctan\left(\frac{Bz}{By}\right) \quad (1)$$

The path of the magnitude $|\overset{\omega}{B}|$ of the magnetic flux density is shown in FIG. 3 as a function of the location z. The vector magnitude $|\overset{\omega}{B}|$ of the magnetic flux density is calculated in known manner from the individual components By and Bz in accordance with the following equation (2). Corresponding calculation rules apply as is conventional for the person skilled in the art when using other coordinate systems or when including a third magnetic field component Bx.

$$|\vec{B}| = \sqrt{By^2 + Bz^2} \qquad (2)$$

As illustrated in FIG. 4, the angle α depends comparatively linearly on the position of the permanent magnet 102 up to a given limit value in relation to the Hall sensor 100. The currently measured characteristic line is generally further linearised, as illustrated in FIG. 4 by means of the line α_lin. That linearised line α_lin then forms the output characteristic line of the sensor. FIG. 5 shows the path of the position signal OUT output by the sensor.

Most commercially conventional 3D Hall sensors can be operated only in the presence of a sufficiently powerful magnetic field. If the permanent magnet is located outside the detection range of the sensor, no sensor signal is available any longer.

There are further known arrangements in which a so-called "clamping", that is to say, omission of the measurement values at the measurement range edge, is carried out. A fixedly predetermined value independent of the current measurement is output in place of the actual measurement values which are no longer reliable. The US patent specification U.S. Pat. No. 6,502,544 B2 describes such a Hall sensor for a throttle valve arrangement in which the sensor signals are set to the lower or upper clamping voltage which constitutes the minimum or maximum possible output voltage of the sensor, respectively.

However, such clamping voltages are not flexible enough for specific technical applications because they are fixedly preset and do not depend on the current measurement value. In particular, such fixedly set clamped measurement values are unsuitable when the sensor loses the magnetic field at the centre of the dynamic range, as occurs, for example, in H-bridge circuits in the automotive sector.

SUMMARY

An object of the present invention is to improve a measurement method and a displacement sensor of the type mentioned so that the displacement sensor can be used for a substantially greater deflection range and has optimised precision in a defined part-range of the deflection range without requiring a more powerful magnetic field source.

This object is achieved by the subject-matter of the independent patent claims. The dependent claims relate to advantageous developments of the method and displacement sensor according to the invention.

The present invention is based on the notion that the magnetic field sensor is further provided with a storage unit which allows a valid sensor signal to be further output when the control by the magnetic field source is lost. In particular, the last position value still determined reliably is stored and output until the permanent magnet has moved again so far in the direction towards the sensor that it produces a sufficiently powerful magnetic field therein. The sensor according to the invention then outputs current measurement values again in place of the stored value.

Since the sensor according to the invention outputs a valid output signal at all times, it can theoretically be used for displacement paths of any size without subsequent hardware and software being disrupted by the signal which is outside permissible values. For applications in which, although the displacement path is relatively large, the measurement range actually involved is only relatively small, it is further possible to dispense with the selection of an unnecessarily large magnet which would be in a position to cover the entire displacement range.

The advantages according to the invention can be achieved particularly readily if a two or three-dimensional Hall sensor is used as the magnetic field sensor and the magnetic field source comprises at least one permanent magnet.

If the magnitude of the magnetic flux density is monitored at the location of the sensor, it is possible in a particularly simple and efficient manner to determine the state in which the magnetic field source has reached an excessively large distance from the magnetic field sensor to still ensure a satisfactory signal-to-noise ratio. Since the sensor detects the individual magnetic field flux density components in any case, no additional technical measurement complexity is necessary for calculating the magnitude of the magnetic flux density, but instead only a calculation needs to be carried out.

For a better understanding of the present invention, it is explained in greater detail with reference to the embodiments illustrated in the following Figures. Identical components are indicated using the same reference numerals and the same component designations. Furthermore, individual features or feature combinations from the embodiments shown and described may also constitute independent solutions which are inventive per se or solutions according to the invention.

DETAILED DESCRIPTION

The invention is now intended to be explained in greater detail below with reference to the Figures.

Figure 1:
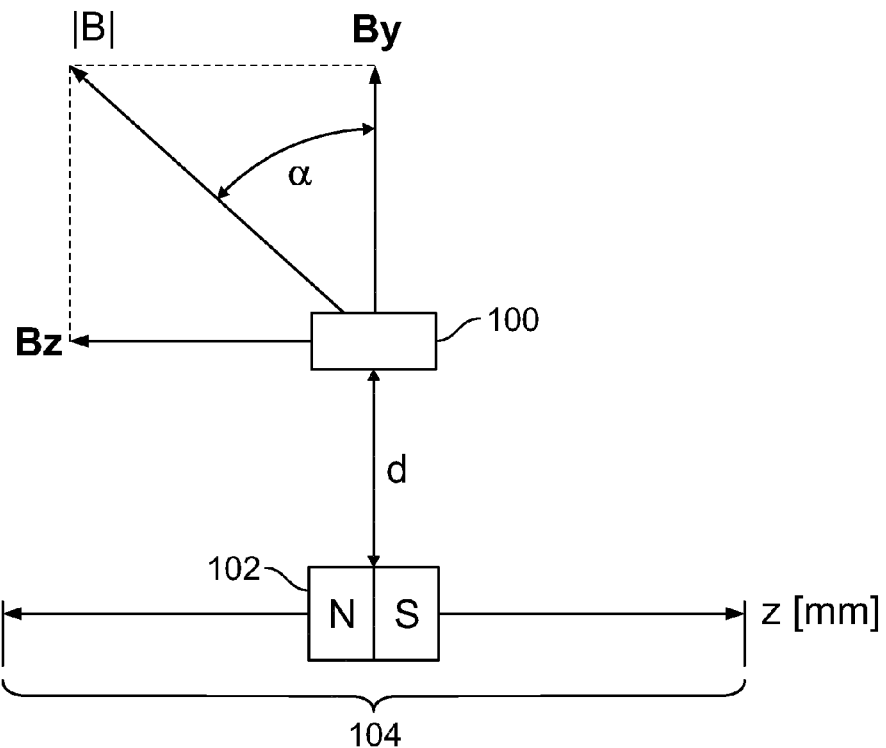
FIG. 1 shows a displacement sensor whose signal can be evaluated according to the present invention.
Figure 2:
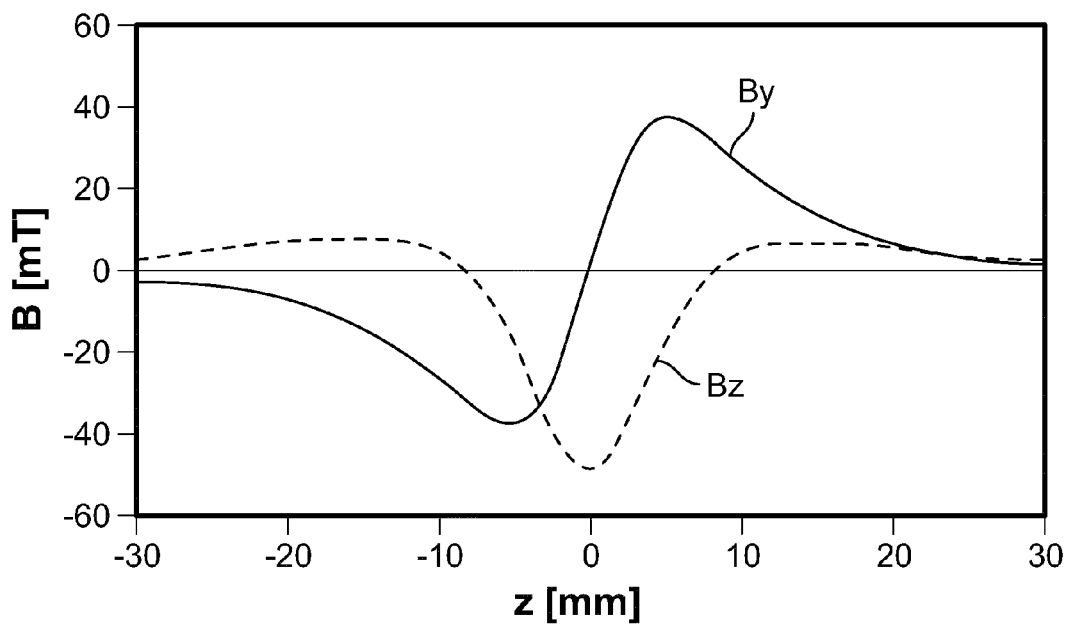
FIG. 2 shows the path of the magnetic field components produced in accordance with the position of the permanent magnet.
Figure 3:
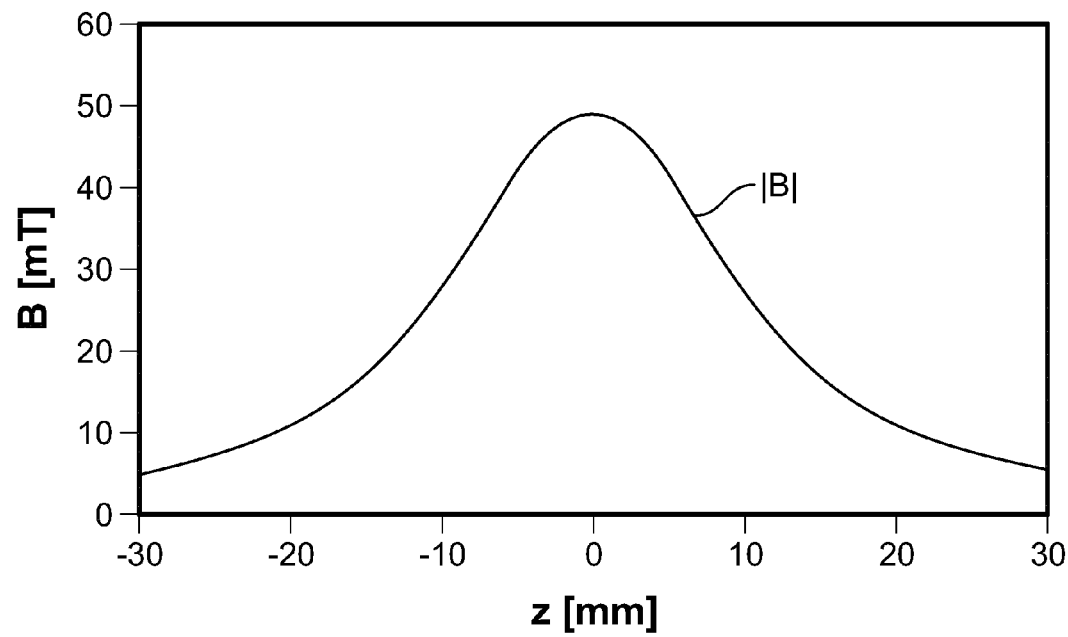
FIG. 3 shows the path of the magnitude of the magnetic flux calculated from the magnetic field components produced.

A displacement sensor arrangement according to a first embodiment is shown in FIG. 1. A Hall sensor 100 is mounted in a fixed position whilst a permanent magnet 102 is supported in a linearly movable manner in relation to the Hall sensor 100. The permanent magnet 102 is polarised in such a manner that its north/south axis is orientated parallel with the direction of movement. In principle, however, the principles of the present invention may also be applied to arrangements in which the permanent magnet 102 is polarised in such a manner that its north/south axis extends transversely to the direction of movement. The permanent magnet 102 can be displaced out of the zero position shown in FIG. 1 in two directions by a displacement path 104 determined by the respective application. The Hall sensor 100 detects at least two orthogonal magnetic field components—one which extends along the movement line and one which extends transversely thereto (see FIG. 2). Vector addition of the two components provides the magnitude of the magnetic field $|\vec{B}|$, as illustrated in FIG. 3. The angle α is defined as the angle which is enclosed by the total magnetic field vector $|\vec{B}|$ with the perpendicular relative to the direction of movement.

As already mentioned, the angle α is calculated from the magnetic field components in or transversely relative to the direction of movement according to equation (1):

$$\alpha = \arctan\left(\frac{Bz}{By}\right) \quad (1)$$

Figure 4:
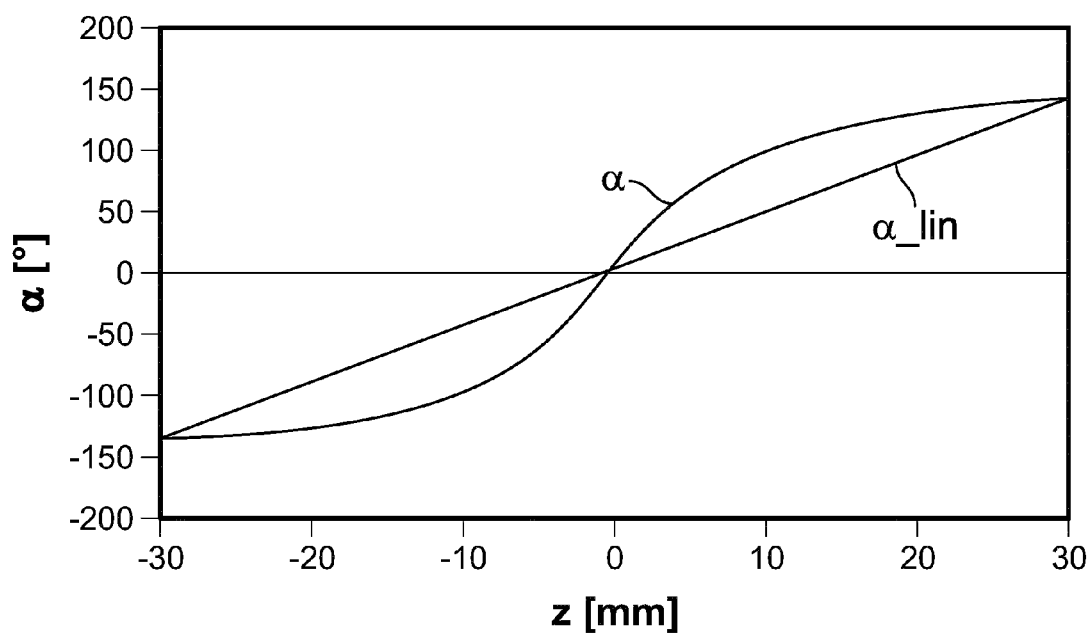
FIG. 4 shows the path of the angle α calculated from the magnetic field components produced and the path of a linearised angle.
Figure 5:
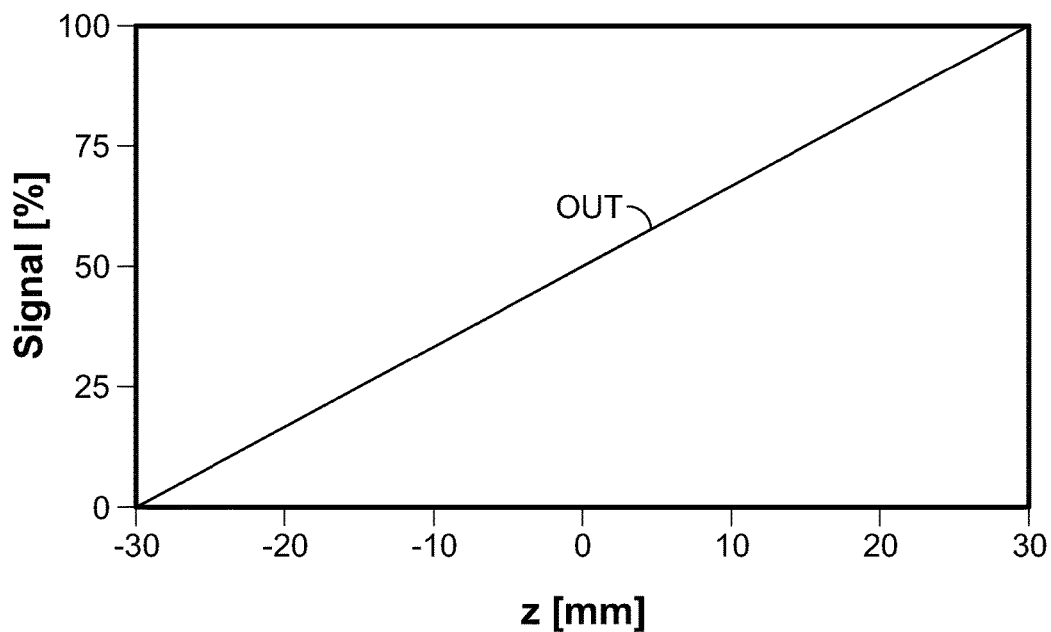
FIG. 5 shows the path of the output signal of the sensor as a function of the position.

The calculated angle α is linearised in order to be available as a displacement-proportional output signal OUT, as illustrated in FIGS. 4 and 5.

Naturally, the principles according to the invention may also be transferred to other magnetic field sources, for example, electromagnets, and to other magnetic field sensors, such as magnetoresistive sensors or inductive sensors.

In the present description, on the one hand, the values of the magnetic field in the direction of movement Bz and, on the other hand, the values of the magnetic field transversely to the direction of movement By are used as the magnetic field components which are measured in accordance with the position of the permanent magnet 102 in the magnetic field sensor, in this instance a Hall sensor 100. Naturally, the values Bx extending orthogonally to By can also be used for the calculation.

Figure 6:
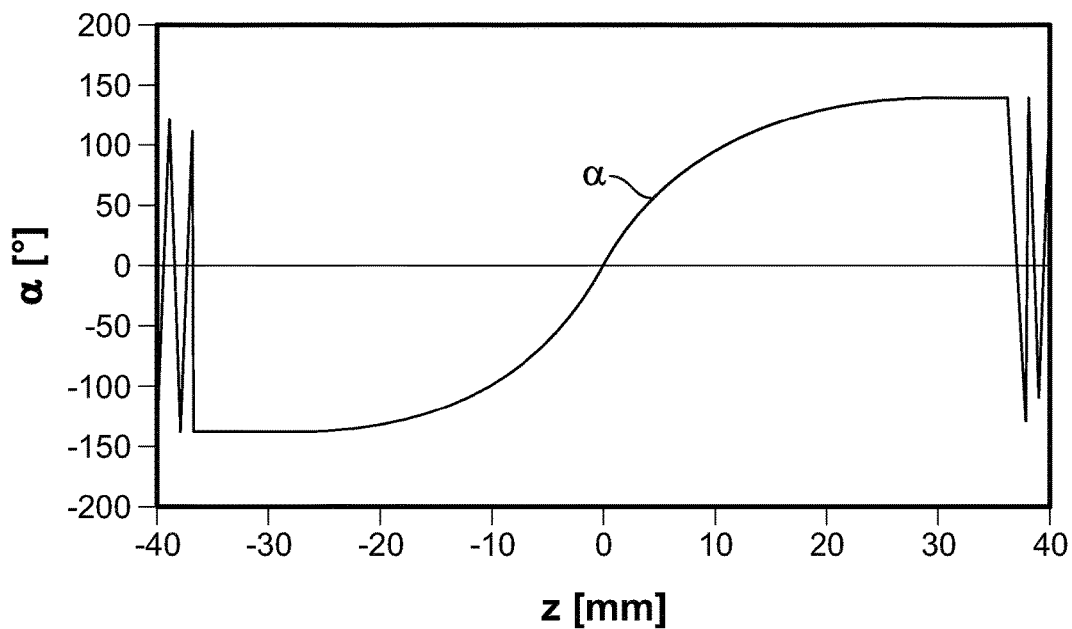
FIG. 6 shows the path of the angle α for displacement paths outside the actual measurement range.

FIG. 6 shows the angle α calculated according to equation (1) for a more extensive displacement range between −40 and +40 mm for the arrangement of FIG. 1, in which the 3D Hall sensor 100 is positioned at the centre of the measurement path to be detected. At the position z=0, the magnitude of the magnetic control field $|\vec{B}|$ is at a maximum. At the measurement range ends (in this instance: at z values of more than +35 or −35 mm), the magnetic control field becomes very weak so that the values for By and Bz for calculating the angle become very small and accordingly the signal-to-noise ratio of both values becomes unfavourable for the calculation. This results in a great variation up to an oscillation of the value α at the measurement range ends, as illustrated in FIG. 6.

Figure 7:
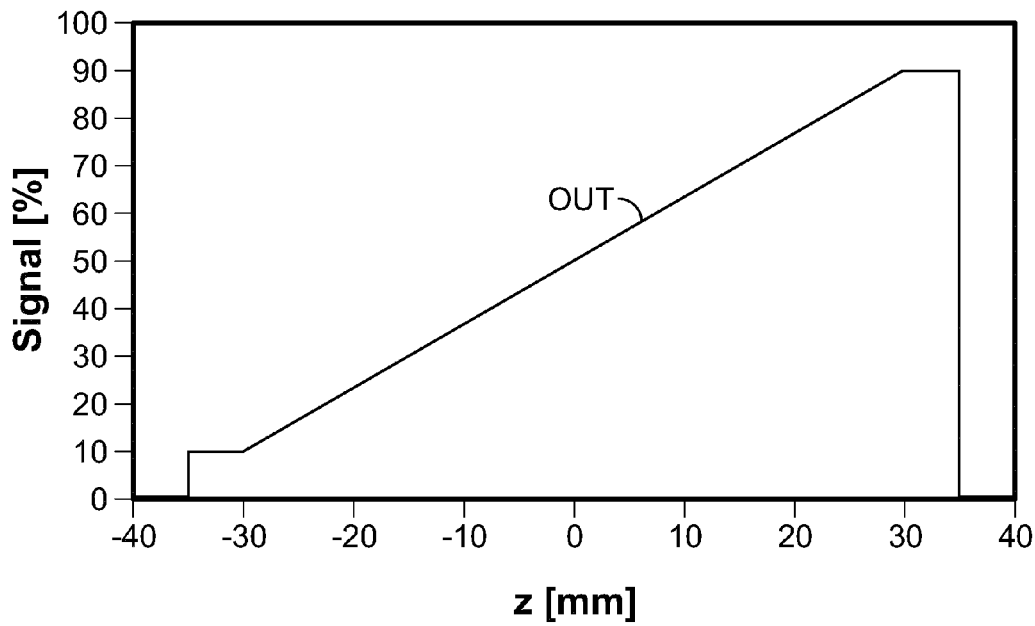
FIG. 7 is an illustration of the output signal of a sensor without a storage unit during operation with a large displacement path.

In order to suppress this undesirable behaviour, the magnitude $|\vec{B}|$ is continuously monitored in many known sensors. If a value falls below a minimum value, the sensor signal is switched off or a value outside the admissible characteristic line range is output. This is illustrated in FIG. 7. In this instance, the sensor is switched off for a range z<−35 mm and z>+35 mm and the displacement position of the magnet can no longer be illustrated. The signal-to-noise ratios of the magnetic flux densities By or Bz therefore delimit the maximum possible displacement range of the magnet in those known sensors because the components of the magnetic flux density still have to be large enough to supply a meaningful measurement signal. Accordingly, the present invention proposes a 3D Hall sensor 102 having a storage unit 106.

Figure 8:
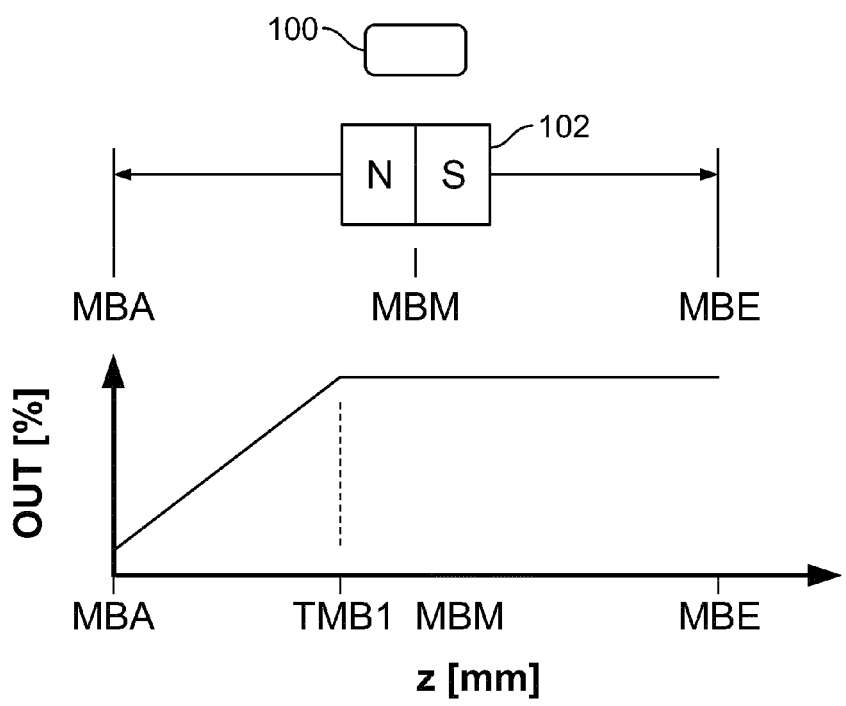
FIG. 8 is a schematic illustration of a sensor arrangement for detecting an edge region of the measurement range.
Figure 9:
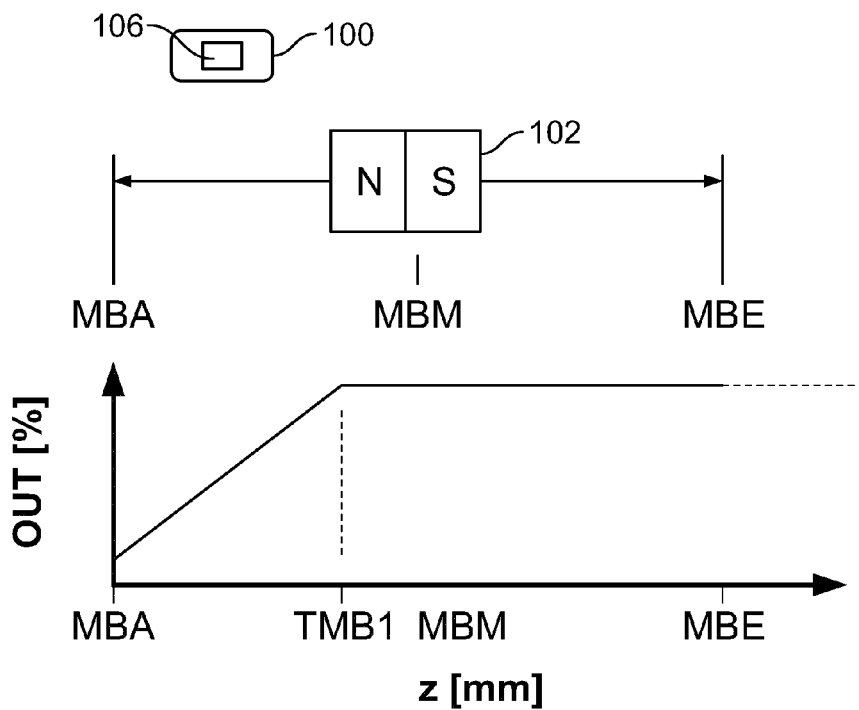
FIG. 9 is a schematic illustration of a sensor arrangement according to the present invention for efficiently detecting a part-measurement range at the edge of the displacement range.

For, in many applications, only the precise detection of a portion of the displacement range of the magnet is required whereas the remaining displacement range can be represented in a relatively imprecise manner and the output of a constant valid signal is sufficient in this range. If the sensor is positioned centrally in the entire displacement range for such applications, a comparatively large permanent magnet 102 having a very powerful control field has to be used so that the signal-to-noise ratio remains sufficiently large for reliable detection over the entire measurement range. FIG. 8 shows such an arrangement, with MBA designating the measurement range start, MBE the measurement range end and MBM the measurement range centre. TMB1 shows the partial measurement range 1 of interest.

By means of the sensor according to the invention, the output characteristic line can be produced in a substantially simpler manner and with a substantially smaller permanent magnet 102 by the sensor 100 being positioned directly in the partial measurement range between MBA and TMB1 and the movable magnet being configured to be only so large that its control field is sufficiently powerful for this partial measurement range. According to the invention, the sensor 100 has a storage device 106 which is in a position to function as a latch for storing the last current value α before the magnet leaves the detection range. Alternatively or additionally, the linearised output value OUT which may optionally be further processed in another manner can also be stored.

The sensor outputs this value until the magnet 102 is brought back into the detection range of the sensor 100. In other words: the 3D Hall sensor 100 according to the invention is supplemented by a storage function of the last output value so that displacement ranges of the magnet which are infinitely large in theory are possible in the measurement arrangement with the sensor nevertheless behaving in a stable manner.

Figure 10:
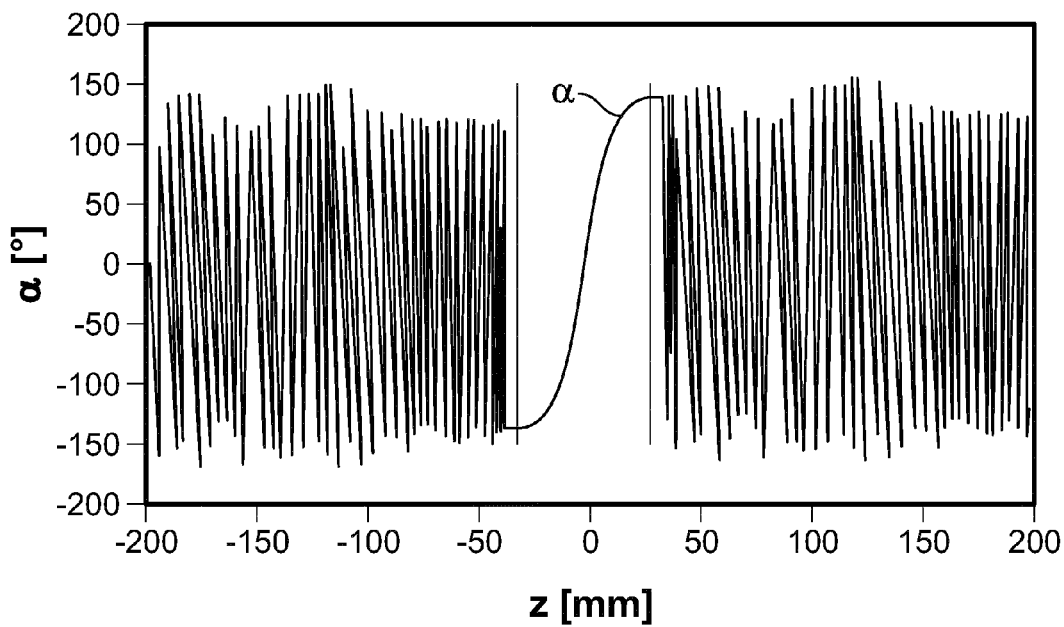
FIG. 10 shows the path of the calculated angle α for relatively large displacement paths z.
Figure 11:
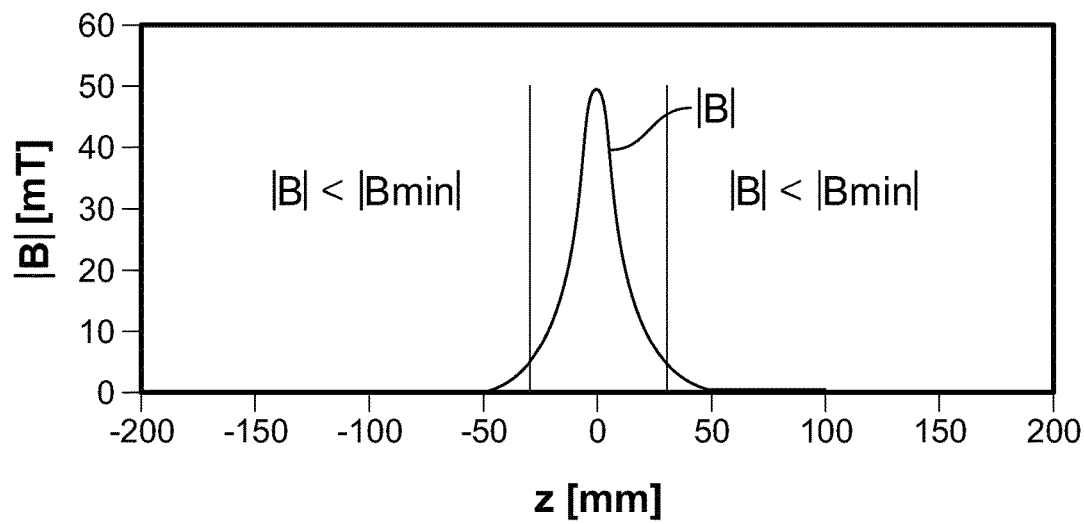
FIG. 11 is an illustration of the path of the magnitude of the magnetic flux density belonging to FIG. 10.
Figure 12:
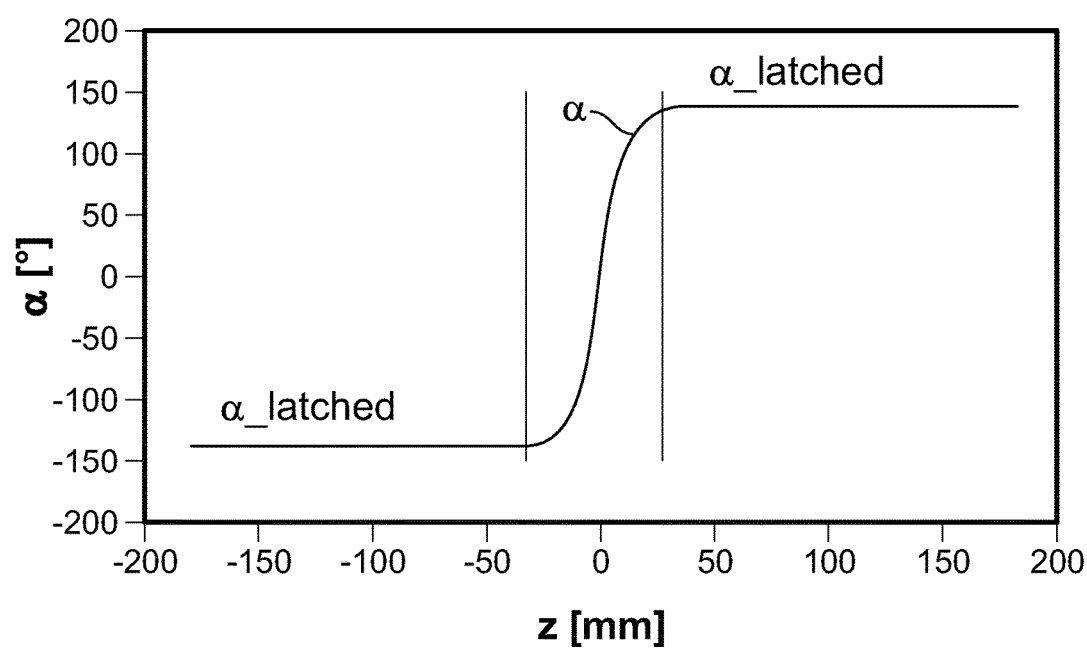
FIG. 12 is a schematic illustration of the stored angular values using the present invention.
Figure 13:
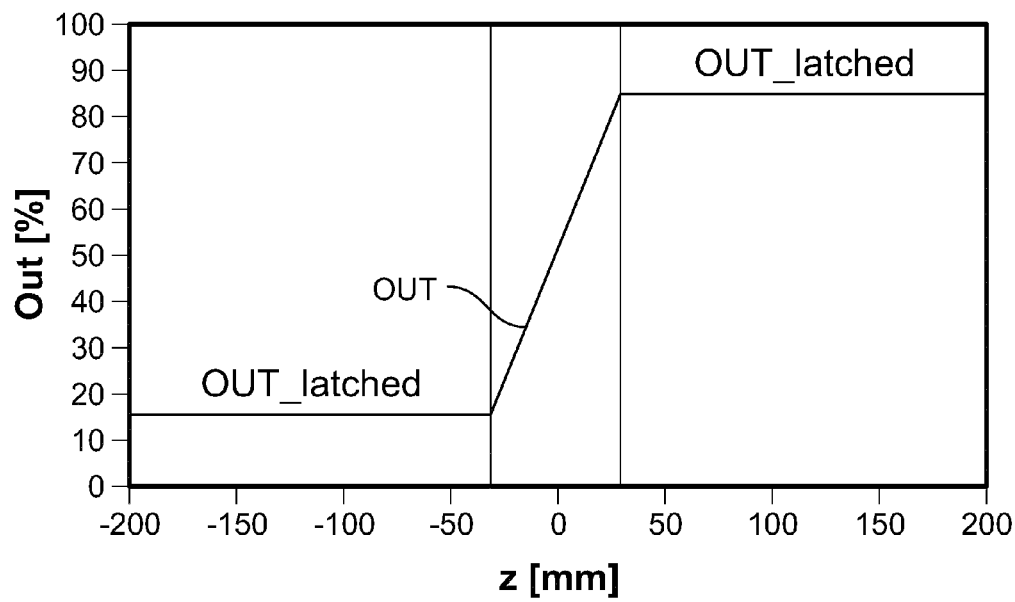
FIG. 13 is an illustration of the output values calculated from the angular values of FIG. 12.

FIG. 10 shows the behaviour of the angle α with an extended displacement range of the magnet. The magnet leaving the detection range is evaluated by means of the magnitude of the flux density $|\vec{B}|$, as shown in FIG. 11. If the magnitude $|\vec{B}|$ is smaller than a threshold value for the minimum flux density Bmin, the last valid value of α is stored as the storage value α_latched and is further used for the calculation of the output signal OUT (see FIGS. 12 and 13).

Figure 14:
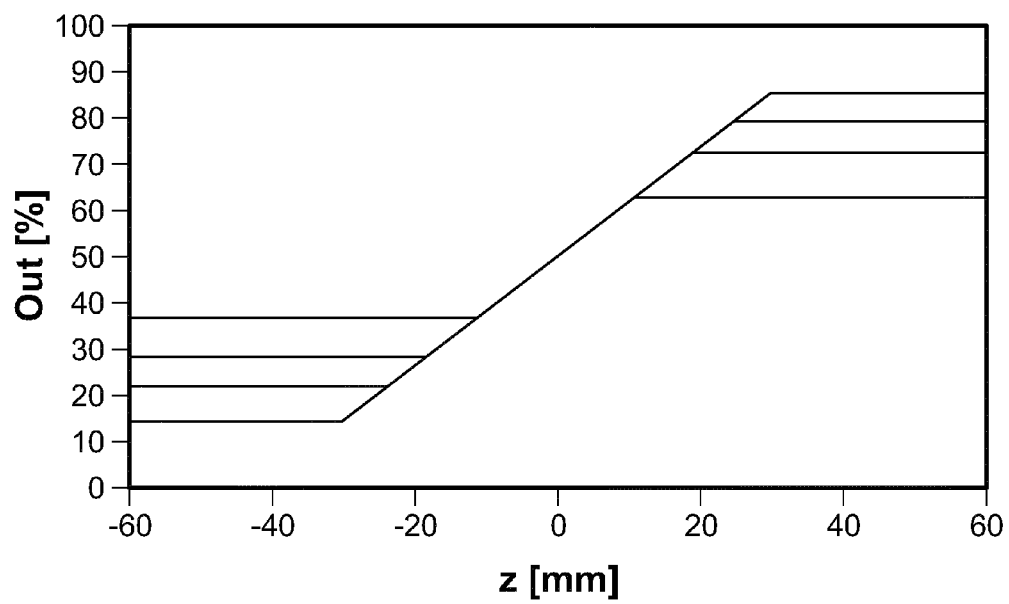
FIG. 14 is an illustration of the output values in accordance with the position for various threshold values of the magnetic flux density.

Depending on how narrow the admissible range is selected to be for the magnitude of the B field, the position of the stored values and the width of the remaining linear range change. This is indicated schematically, for example, in FIG. 14. A delimitation to greater threshold values Bmin has the advantage that the signal-to-noise ratio is greater and the risk of disruptions is lower but has the disadvantage that the actual dynamic measurement range is narrower.

A number of advantageous application examples are intended to be set out below for the storing 3D Hall sensor according to the invention.

Figure 15:
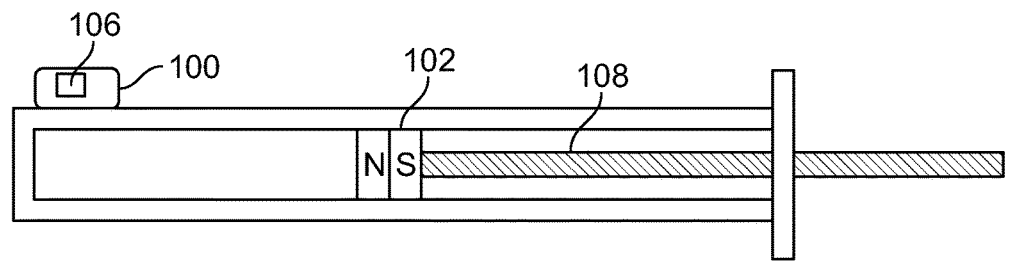
FIG. 15 is a schematic illustration of a measurement arrangement for precisely measuring the retraction position in a cylinder application.

FIG. 15 shows a sensor arrangement which allows a precise measurement of the retraction position for controlling an end position in cylinder applications. The movable magnet 102 is secured to the cylinder piston 108 in this instance. The sensor 100 is located in the region of the end position which constitutes the measurement range which is really of interest.

Figure 16:
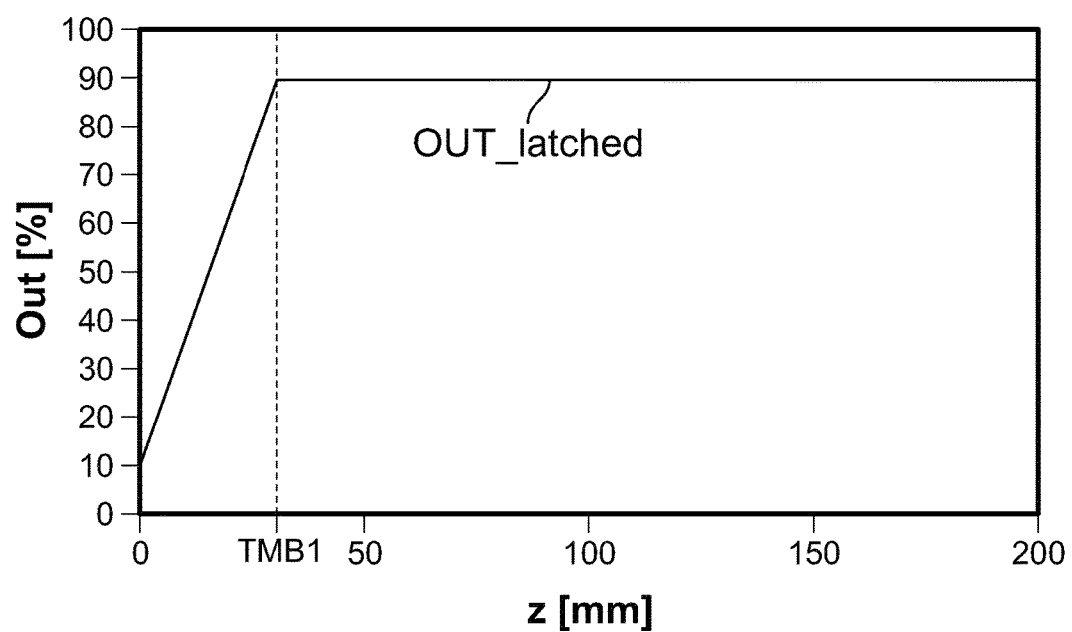
FIG. 16 shows the output signal output for the arrangement of FIG. 15 in accordance with the displacement path.

The associated output characteristic line over the location is shown in FIG. 16. It can clearly be seen that the necessary displacement path is comparatively large at 200 mm but that over a great distance z>TMB1 only the stored final value OUT_latched is output to the connected signal processing unit until the magnet 102, at the position z=TMB1, enters the range in which it produces a sufficiently high magnetic field for the sensor 100. According to the invention, the sensor again outputs actually measured values in place of the stored value OUT_latched.

Figure 17:
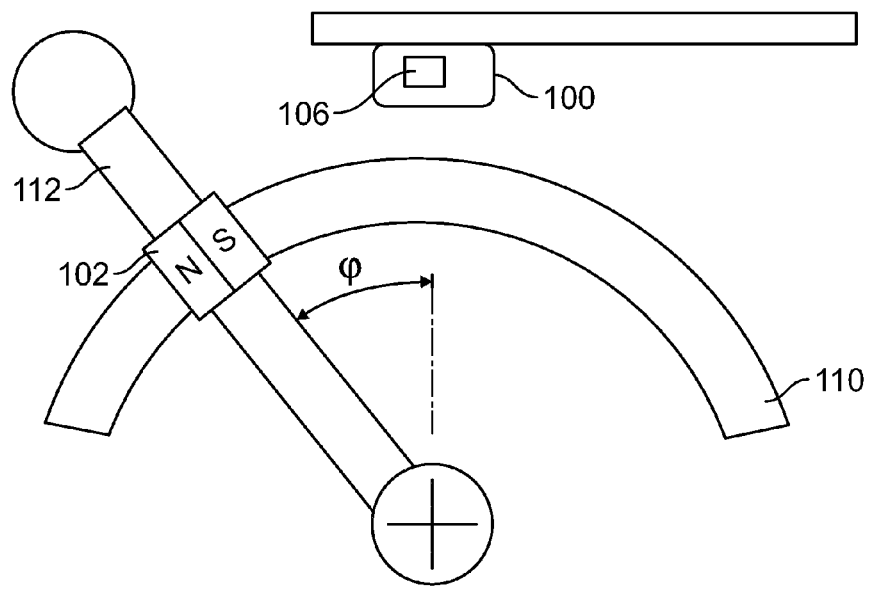
FIG. 17 is a schematic illustration of a measurement arrangement for precisely measuring a central position of selection levers.
Figure 18:
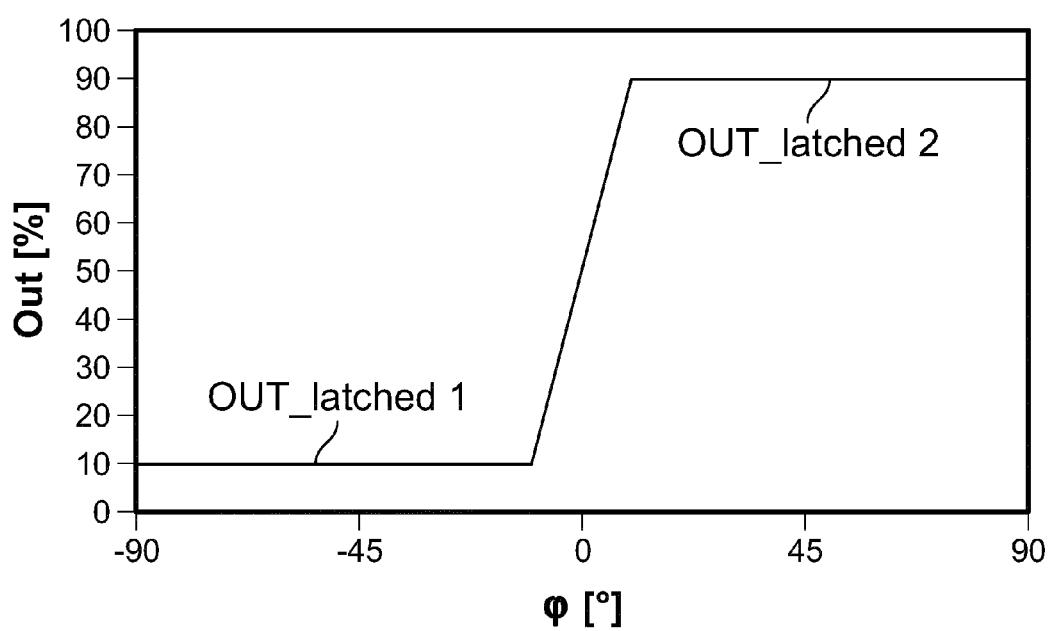
FIG. 18 shows the path of the output signal in accordance with the angle φ for the arrangement of FIG. 17.

Another advantageous application of the sensor arrangement according to the invention is illustrated in FIGS. 17 and 18 for the precise measurement of a central position or neutral position of selection levers. The displacement path of the permanent magnet 102 extends over a circular arc 110 in this instance, the selection lever 112 being connected to the permanent magnet 102. The sensor 100 is secured in such a manner that it is nearest the movable magnet 102 when the selection lever 112 is located in the zero position to be detected.

As illustrated in FIG. 18, the displacement path can extend, for example, in a range from −90° to +90° for the angle φ. However, only a partial range of a few angular degrees around the zero position has to be detected precisely. A comparatively small magnet 102 extends around it if valid measurement values in subsequent electronic evaluation units in the edge regions which are not of interest in principle. This is carried out according to the invention in that the last measurement value before leaving the defined measurement range is stored and is output for the entire remaining displacement range.

Figure 19:
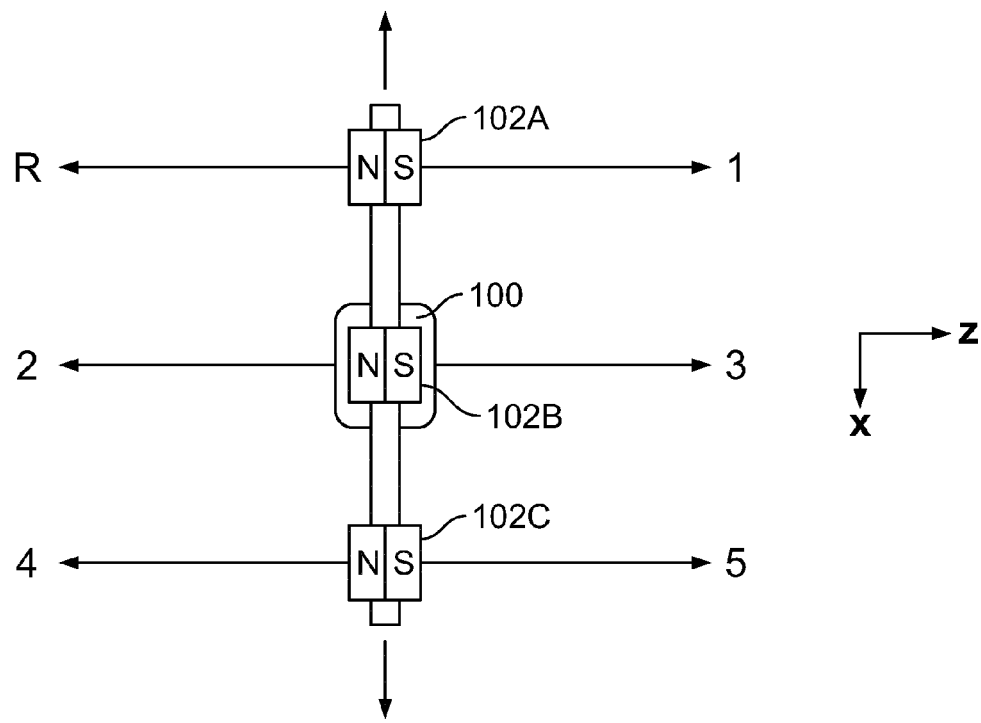
FIG. 19 is a view from below of a measurement arrangement for detecting the neutral position of an H-bridge circuit.
Figure 20:
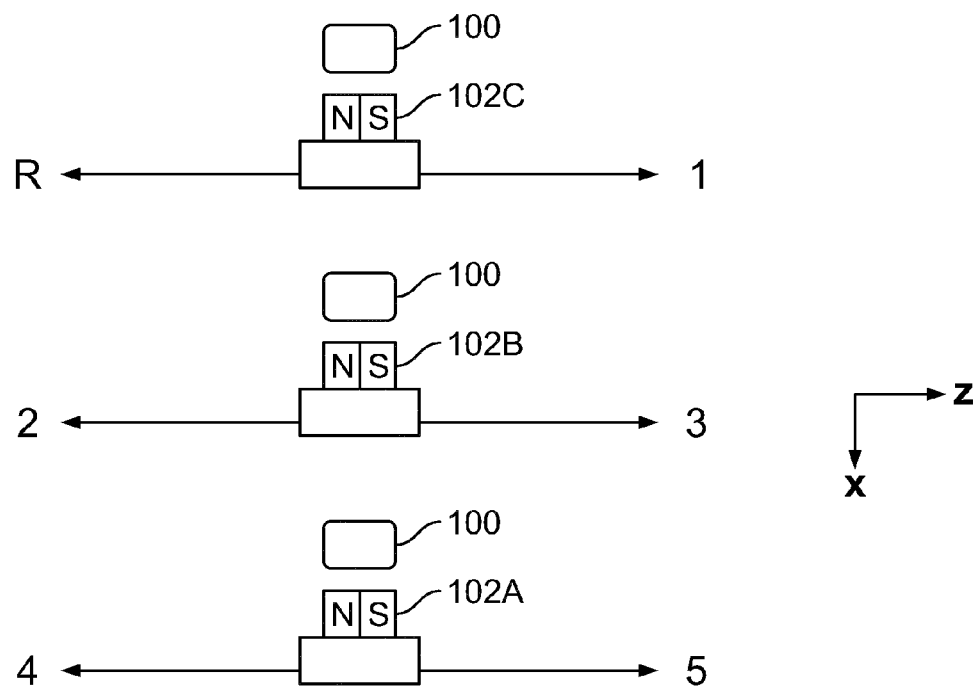
FIG. 20 shows side views of the individual gaps for the arrangement of FIG. 19.

Another advantageous application is shown in FIGS. 19 to 23. The arrangement according to the invention may also be used in an advantageous manner for precisely measuring a neutral position of H-bridge circuits in a car. As known in principle, an individual control magnet 102A, 102B, 102C is used for each gap. In the case of a gap change owing to lateral displacement of the magnet arrangement, as indicated in FIG. 19, the sensor 100 stores the current value in the range of the central position until the magnet of the neighbouring gap is detected.

Figure 21:
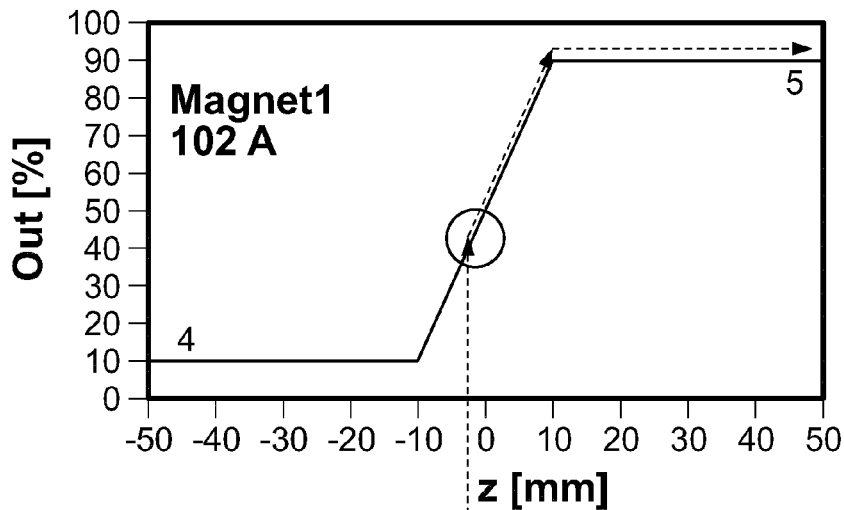
FIG. 21 shows the output signal of the sensor in accordance with the position of the first magnet.
Figure 22:
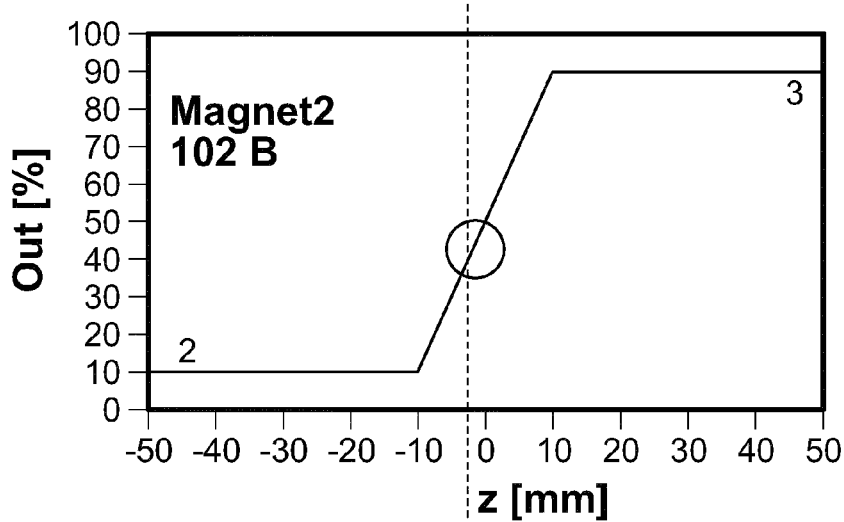
FIG. 22 shows the output signal of the sensor in accordance with the position of the second magnet.
Figure 23:
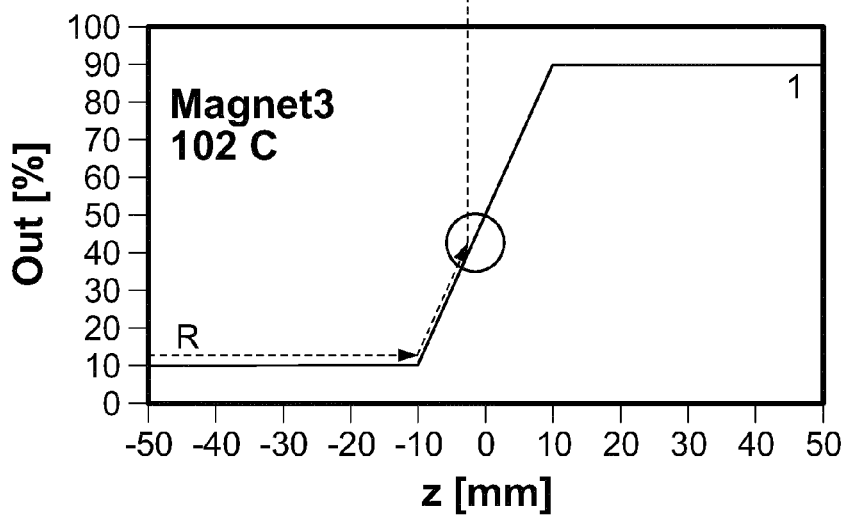
FIG. 23 shows the output signal of the sensor in accordance with the position of the third magnet.

The associated measurement signals are shown in FIGS. 21 to 23. A hypothetical switching path from reverse gear R to $5^{th}$ gear 5 is schematically shown by a discontinuous line: first, the sensor 100 does not measure any magnetic field at all and therefore outputs as the output signal the last valid measurement value (produced by the magnet 102C). During further displacement in a positive z direction, the control field becomes large enough owing to the magnet 102C for the sensor 100 to output currently measured values. If the gap changes, the entire magnet arrangement of FIG. 19 now moves in the x direction so that the B field measured at the sensor 100 falls below the threshold value |Bmin|. The sensor 100 then outputs the last value measured in the dynamic range of the characteristic line from FIG. 23 until the magnet 102B produces a sufficiently large control field.

In this state, current measurement values of the characteristic line from FIG. 22 can be output temporarily. In the case of further displacement of the magnet arrangement in a negative x direction, the sensor also loses the control by means of the second magnet 102B and outputs the last measurement value stored until it is controlled by the third magnet 102C. Since the magnet arrangement moves in a positive z direction, the output signal OUT first changes over the dynamic range in which measured values are output. If the control magnetic field is lost in the z direction, the sensor 100 outputs the last valid measurement value for all positions over approximately 10 mm.

Therefore, the sensor according to the invention has the advantage that it measures in a substantially more precise manner in a small partial measurement range but supplies measurement values which are valid over the entire displacement range to subsequent units and consequently can be used in a substantially broader environment. Furthermore, substantially smaller control magnets are sufficient for achieving the measurement objective. Furthermore, the storage function according to the invention also affords the possibility of storing any values which have currently been measured before the sensor has lost control by means of the magnetic field source even if that stored value is not at the upper or lower end of the measurement values occurring.

| LIST OF REFERENCE NUMERALS | |
|---|---|
| 100 | Hall sensor |
| 102 | Permanent magnet |
| 102A, 102B, 102C | |
| 104 | Displacement path |
| 106 | Storage unit |
| 108 | Cylinder piston |
| 110 | Circular arc |
| 112 | Selection lever |

The invention claimed is:

1. A method for contactlessly measuring a relative position of a magnetic field source which produces a magnetic field and a magnetic field sensor in relation to each other,
wherein the magnetic field source and the magnetic field sensor are movable relative to each other,
wherein the magnetic field sensor detects at least two spatial components (By, Bz) of a magnetic flux density of the magnetic field and a position signal is produced from the measured components, and wherein the method comprises the following steps:
calculating the position signal on the basis of a quotient of the two magnetic flux density components,
calculating a magnitude of the magnetic flux density and comparing the magnitude with a predetermined threshold value,
outputting the current calculated position signal if the magnitude of the magnetic flux density is higher than the threshold value,
outputting a preceding stored position signal if the magnitude of the magnetic flux density is smaller than or equal to the threshold value, and
storing the output position signal.

2. The method according to claim 1, wherein the magnetic field sensor comprises a two or three-dimensional Hall sensor.

3. The method according to claim 1, wherein the magnetic field source comprises at least one permanent magnet.

4. The method according to claim 1, wherein the calculation of the position signal comprises:
establishing an angle α according to $$\alpha = \arctan\left(\frac{Bz}{By}\right);$$

linearising the angle in order to produce a displacement-proportional output signal.

5. The method according to claim 1, wherein the calculation of the magnitude of the magnetic flux density is carried out by calculating the vector magnitude from the at least two spatial components (By, Bz) of the magnetic flux density of the magnetic field.

6. The method according to claim 1, wherein the storage of the position signal comprises the storage of a value of the angle $$\alpha = \arctan\left(\frac{Bz}{By}\right)$$

and/or the storage of a linearised value of the angle.

7. A displacement sensor for contactlessly measuring a relative position of a magnetic field source which produces a magnetic field and a magnetic field sensor in relation to each other,
wherein the magnetic field source and the magnetic field sensor are movable relative to each other,
wherein the magnetic field sensor is constructed in such a manner that it detects at least two spatial components (By, Bz) of a magnetic flux density of the magnetic field and produces a position signal from the measured components,
wherein the magnetic field sensor comprises:
a control and calculation unit for calculating the position signal on the basis of a quotient of the two magnetic flux density components, and for calculating a magnitude of the magnetic flux density and comparing the magnitude with a predetermined threshold value, wherein the control and calculation unit can be operated in order to output the current calculated position signal if the magnitude of the magnetic flux density is higher than the threshold value and in order to output a preceding stored position signal if the magnitude of the magnetic flux density is smaller than or equal to the threshold value, a storage unit for storing the output position signal.

8. The displacement sensor according to claim 7, wherein the magnetic field sensor comprises a two or three-dimensional Hall sensor.

9. The displacement sensor according to claim 7, wherein the magnetic field source comprises at least one permanent magnet.

10. The displacement sensor according to claim 7, wherein the magnetic field source produces a magnetic field which is rotationally symmetrical relative to an axis which is defined by a relative linear movement between the magnetic field source and the magnetic field sensor.

11. The displacement sensor according to claim 7, wherein the magnetic field source and the magnetic field sensor are arranged in a zero position so that the magnetic field sensor is fixed in a position at which the magnitude of the magnetic flux density produced by the magnetic field source is smaller than or equal to the threshold value.

* * * * *